United States Patent [19]

Kropuenske et al.

[11] Patent Number: 5,350,979
[45] Date of Patent: Sep. 27, 1994

[54] METHOD OF ANALYZING TELEVISION CIRCUITS AND INSTRUMENTATION THEREFOR

[75] Inventors: Glen Kropuenske, Humboldt; Scott A. Schlag, Sioux Falls, both of S. Dak.

[73] Assignee: Sencore, Inc., Sioux Falls, S. Dak.

[21] Appl. No.: 978,433

[22] Filed: Nov. 18, 1992

[51] Int. Cl.$^5$ .............................................. H01J 29/70
[52] U.S. Cl. ...................................... 315/411; 348/180
[58] Field of Search ........................... 315/411; 358/10

*Primary Examiner*—Theodore M. Blum
*Attorney, Agent, or Firm*—Patnaude, Videbeck & Marsh

[57] ABSTRACT

The horizontal output stage of a television receiver is tested by denergizing the receiver so as to remove B+ voltage from the horizontal output stage, and then powering the horizontal output stage from an independent low voltage DC power supply through a switch which is turned on and off at the horizontal sweep frequency to permit making measurements of operating parameters of said horizontal output stage.

7 Claims, 1 Drawing Sheet

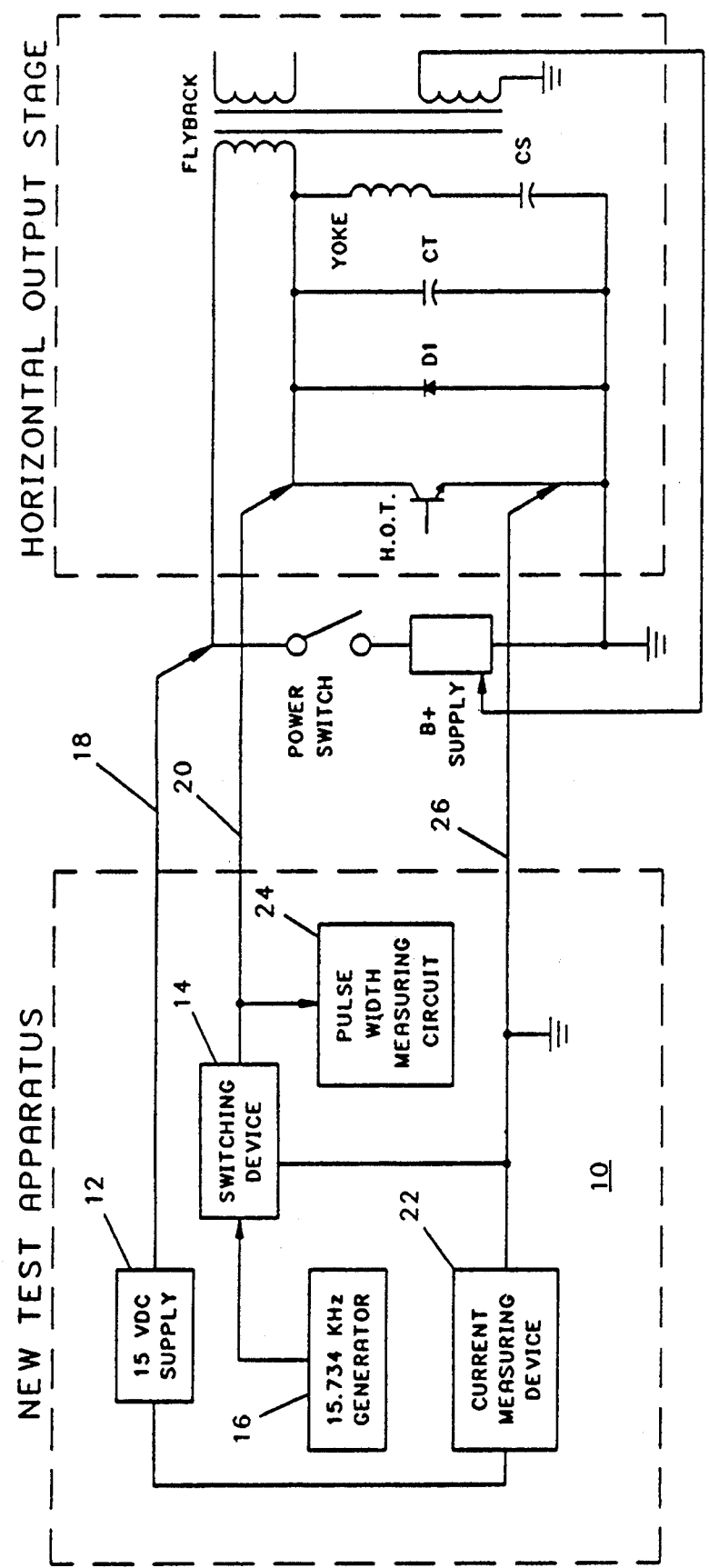

METHOD OF ANALYZING TELEVISION CIRCUITS AND INSTRUMENTATION THEREFOR

The present invention relates in general to a method and instrument for analyzing television circuits, and it relates more particularly to a new and improved method and instrument for troubleshooting the horizontal output stage of television receivers.

BACKGROUND OF THE INVENTION

Because the horizontal output circuits of a television receiver contain very high voltages and currents when in operation, it is difficult to analyze such circuits when using the methods and instruments heretofore known in the prior art. The older television receivers allowed a service technician to reduce the voltages and currents in the horizontal output circuits by lowering the applied AC power voltage with the aid of a variable AC power source. However, many present day television receivers incorporate Switch Mode power supplies which strive to maintain a constant level of internal voltage irrespective of changes in the input AC voltage level. Also, contemporary televisions receivers include a Safety Shutdown circuit which deenergizes the television receiver when the level of voltage applied to the picture tube could cause hazardous levels of radiation from the picture tube. These two developments in television receiver design have made it virtually impossible to troubleshoot the horizontal output circuits using conventional techniques without endangering the service technician and the components of the television receiver.

The horizontal output stage of a television receiver is the main current load on the B+ power supply and is responsible for developing the high voltage for the cathode ray picture tube. Problems in the horizontal output stage or in the flyback transformer secondary circuits typically increase the current demand from the B+ power supply and/or alter the timing of the horizontal output stage. Since the horizontal output stage operates at voltage levels as high as 1500 volts and current levels as high as 1.5 amps, extreme care must be used during any circuit analysis being made while these very high normal voltage and current levels exist.

Since it is important to test the horizontal output circuits of present day television receivers, it would be desirable to provide an instrument and method for safely testing these circuits.

SUMMARY OF THE INVENTION

In accordance with the teachings of the present invention the horizontal output circuits are independently powered at a lower than normal voltage level while the receiver is being tested for excessive current demand on the main B+ power supply and for retrace timing related problems. These two TV troubleshooting problems could not be detected by service technicians using conventional test methods because full AC voltage cannot be applied to the TV chassis for troubleshooting purposes.

Briefly, the present invention provides for a test instrument which includes a relatively low voltage DC power supply and an independent switching device which connects the low voltage power supply to the flyback transformer of the receiver under test at the standard horizontal sweep frequency of 15,734 Hz. thereby causing the horizontal output stage to operate in the conventional manner but at a very B+ voltage level.

This novel test instrument also includes a current measuring device such, as an amp meter, which measures and displays the level of current through the primary winding of the flyback transformer, and a pulse width measuring circuit which displays the length of the pulse widths of the voltage pulses developed across the primary winding of the flyback transformer. These two measurements enable the service technician to detect and isolate any problems in the horizontal output stage of the television receiver under test.

GENERAL DESCRIPTION OF THE DRAWINGS

A better and more complete understanding of the invention may be had from a reading of the following detailed description of the invention taken in connection with the accompanying drawing wherein:

The single FIGURE is a schematic circuit diagram of an instrument embodying the present invention connected to the horizontal output circuits of a present day television receiver for analyzing the horizontal output circuits in accordance with the method of the present invention.

DETAILED DESCRIPTION OF A PREFERRED EMBODIMENT OF THE INVENTION

Referring to the drawing, the test apparatus embodying the present invention is generally identified by the reference number 10 and is shown to be connected to a typical horizontal output stage of a present day television receiver.

The principal components of the horizontal output stage are a horizontal output transistor conventionally labeled H.O.T., a flyback transformer labeled flyback, a retrace timing capacitor labeled CT, a damper Diode labeled D1. a horizontal yoke labeled yoke, and a capacitor labeled CS connected in series with the yoke. It may be seen that the transistor H.O.T., the diode D1, and the capacitor CT are connected in parallel with the series connection of the yoke and the capacitor CS. This parallel circuit is in turn connected in series with the primary winding of the flyback transformer across the output of the B+ power supply.

In order to better understand the present invention an understanding of the operation of the horizontal output stage may be helpful.

The horizontal output transistor, H.O.T., is essentially a switch which provides a path for current flow through the primary winding of the flyback transformer and the horizontal yoke. A signal, not shown, applied to the base of the transistor causes the transistor to switch at the rate of 15,734 Hz. The conduction time of the transistor H.O.T. is approximately 30 microseconds and it conducts until the start of the horizontal sync when it is turned off by the signal to its base.

The flyback transformer is primarily responsible for developing the high voltage used by the picture tube, and is specially constructed to operate efficiently at high frequencies. It has one primary winding and a plurality of secondary windings. As shown, the primary winding is connected in series with the H.O.T. transistor and the B+ power supply so that the switching of the H.O.T. transistor between the open and closed conditions produces current pulses through the primary winding which produce high inductive voltages across the primary winding of the flyback transformer.

The voltage induced across an inductance is expressed by the formula $V=L(\Delta i/\Delta t)$. When the H.O.T. transistor is conducting, the current in the primary of the flyback transformer increases at a linear rate, producing a constant voltage across the windings of the flyback transformer. When the H.O.T. transistor is abruptly turned off to open the series circuit including the primary winding and the B+ power supply, the rapidly collapsing magnetic field in the windings of the transformer produces a high voltage across the primary winding. This voltage may be as high as 1500 volts. The retrace timing capacitor CT functions to slow down the rate at which the magnetic field in the windings of the flyback transformer collapses.

The switching action of the H.O.T. transistor thus produces alternating current in the flyback transformer and in the deflection yoke whereby power is transferred from the primary winding to the secondary windings of the flyback transformer. Defective components in the circuits connected to the primary winding or to the secondary windings act to increase the current supplied by the B+ power supply to the horizontal output stage.

It will thus be seen that the flyback inductance, the retrace timing capacitor, and the deflection yoke components determine the rate at which the magnetic field in the flyback transformer collapses. This rate determines the amplitude of the inductive voltage pulses and thus the high voltage developed. Defects in the components of the horizontal output stage can affect this timing and result in excessively high voltage.

As described hereinbefore, because of the switch mode power supplies now common in present day television receivers and which regulate the B+ power supplies to maintain a constant B+ DC voltage in spite of wide variations in the level of the AC power voltage, servicing of the horizontal output circuits can no longer be done by reducing the level of the applied AC power voltage to reduce the level of the B+ power supply. Moreover, there is a threshold AC voltage level below which the B+ output is abruptly turned off. Indeed, attempts to operate a present day television receiver at low levels of AC power voltage can result in high currents being supplied to problem circuits or components causing stress or immediate damage to such circuits or components.

In addition, the newer television receivers include high voltage safety shutdown circuits which limit harmful radiation from the picture tube attributable to excessively high voltage being applied thereto. Excessively high voltage on the picture tube commonly results from a failure of the B+ power supply regulator or from defective timing related components in the horizontal output stage. Consequently, timing problems in the horizontal output stage commonly result in a safety shutdown of the television receiver which removes the B+ voltage from the horizontal output stage making it impossible to troubleshoot the horizontal output stage using the conventional testing methods of the prior art.

The new test instrument 10 may be seen to include a 15 volt DC power supply 12, a switching device 14, which is preferably a transistor, and a generator 16 which turns the switching device 14 on and off at the horizontal sweep rate of 15,734 KHz. When using the instrument 10 to troubleshoot the horizontal output stage of a television receiver, the output lead 18 from the power supply 12 is connected to the end of the primary winding of the flyback transformer in the receiver which is connected to the plus terminal of the B+ power supply of the receiver. The output lead 20 from the switching device 14 is connected to the other end of the primary winding of the flyback transformer. The main power switch of the television receiver is open during the test that the internal B+ power supply of the receiver is deenergized and the horizontal output stage is powered only from the low voltage power supply 12. The power supply 12 is regulated as to both voltage and current to protect the power supply and the components in the horizontal output circuit of the television receiver from damage during the test in case of a low resistance or shorted condition in the horizontal output stage.

It may thus be seen that the switching device 14 and the power supply 12 are connected in series with the primary winding of the flyback transformer. The switching device 14 is driven between the open and closed conditions at a rate of 15,734 KHz and has an on duration of 30 microseconds. Therefore, the horizontal output stage of the television receiver under test is energized at a low voltage by the test instrument 10 and may operate in the normal manner.

In accordance with another feature of the invention, a current measuring device 22 is connected in series with the primary winding of the flyback transformer, the switching device 14, and the power supply 12. The current measuring device 22 displays the value of the current through the primary winding of the flyback transformer and thus may be used to monitor the output current from the power supply 12.

In addition to the device 22, a pulse width measuring circuit 24 which displays the widths of the voltage pulses applied thereto is connected to the output of the switching device 14 to enable the service technician to monitor the timing of the flyback pulses.

When using the present invention to troubleshoot the horizontal output stage of a television receiver the service technician first makes sure that the main power switch to the receiver is turned off and the AC power line is disconnected from the receiver. The lead line 18 from the low voltage DC power supply 12 is connected to the plus side of the B+ power supply of the receiver. The ground lead line 26 is then connected to the B+ ground of the television receiver. The lead line 20 from the switching device 14 is then connected to the collector of the transistor H.O.T.

With the test instrument 10 thus connected to the television receiver the test instrument is energized, turned on. The technician then observes the displays of the current measuring device 22 and the pulse width measuring circuit 24 to determine if the horizontal output stage of the television receiver under test is operating within its parameters.

By way of example, let us assume that a component in the horizontal output circuit or one of the secondary windings of the flyback transformer is shorted or is excessively leaky, i.e. has too low a resistance, the current from the B+ power supply and measured by the device 22 will be at an abnormally high level. The technician will thus know that there is a problem in the horizontal output stage without actually turning on the receiver. He can then isolate the problem using conventional techniques, correct it, and again use the test instrument 10 to make a safety check before actually applying power to the television receiver.

If one or more of the components in the horizontal output circuit are defective, the timing of the pulses at the collector of the H.O.T. transistor will be altered and the technician will recognize this abnormal condition from the reading displayed by the pulse width measuring circuit 24. Again, standard troubleshooting techniques can then be used to isolate the defective component. After replacing the defective component the test instrument 10 should again be used as a safety check to make sure that the problem has been corrected before the television receiver has again been turned on.

In conclusion, the novel test apparatus and method of the present invention enables a service technician to test for abnormal B+ power supply loading and for timing problems in the horizontal output stage of a television receiver without applying AC power to the receiver. The current measuring device 22 and the pulse width measuring circuit 24 show which parameters are incorrect and thus provide the service technician with the additional information required to quickly and accurately determine which component or components in the receiver are at fault and should be replaced.

While the present invention has been described in connection with a particular embodiment, it will be understood that many changes and modifications may be made therein without departing from the true spirit and scope the invention. Therefore, it is intended by the appended claims to cover all such changes and modifications which fall within the true spirit and scope of the present invention.

What is claimed:

1. A method of testing the horizontal output stage of a television receiver, comprising the steps of
    disconnecting said television receiver from the principle power source to denergize the B+ power supply of said television receiver,
    connecting a source of low DC voltage to said horizontal output stage,
    connecting a switching device in series with said source of low DC voltage and said primary winding to open and close the series circuit including said low voltage DC voltage source and said primary winding at the horizontal sweep frequency of said horizontal output stage, and
    measuring and displaying the DC current through said primary winding of said flyback transformer.

2. The method according to claim 1 comprising the further step of
    measuring and displaying the pulse width of voltage pulses developed across said primary winding.

3. A method of testing the horizontal output stage of a television receiver, comprising the steps of
    disconnecting said television receiver from the principle power source to denergize the B+ power supply of said television receiver,
    connecting a source of low DC voltage to said horizontal output stage,
    connecting a switching device in series with said source of low DC voltage and said primary winding to open and close the series circuit including said low voltage DC voltage source and said primary winding at the horizontal sweep frequency of said horizontal output stage, and
    measuring and displaying the pulse width of voltage pulses developed across said primary winding.

4. A method of testing the horizontal output stage of a television receiver, comprising the steps of
    disconnecting said television receiver from the principle power source to denergize the B+ power supply of said television receiver.
    connecting a source of low DC voltage to said horizontal output stage,
    connecting a switching device in series with said source of low DC voltage and said primary winding to open and close the series circuit including said low voltage DC voltage source and said primary winding at the horizontal sweep frequency of said horizontal output stage, and
    measuring an operating parameter of said horizontal output stage.

5. An instrument for testing the horizontal output stage of a television receiver, said output stage having a flyback transformer, comprising
    a low voltage DC power supply,
    switch means for connecting said power supply to said flyback transformer at a rate of approximately 15734 Hz, and
    measuring means for measuring and displaying an operating parameter of said horizontal output stage.

6. An instrument according to claim 5 wherein
    one of said operating parameters is the current from said power supply to said flyback transformer.

7. An instrument according to claim 6 wherein
    one of said operating parameters is the pulse width of the voltage pulses developed across the primary winding said flyback transformer.

* * * * *

UNITED STATES PATENT AND TRADEMARK OFFICE
CERTIFICATE OF CORRECTION

PATENT NO. : 5,350,979
DATED : September 27, 1994
INVENTOR(S) : Glen Kropuenske

It is certified that error appears in the above-identified patent and that said Letters Patent is hereby corrected as shown below:

In column 2, line 1, after "very" insert --low--.

Signed and Sealed this

Thirteenth Day of December, 1994

Attest:

BRUCE LEHMAN

Attesting Officer     *Commissioner of Patents and Trademarks*